United States Patent
Oda et al.

(10) Patent No.: US 7,852,496 B2
(45) Date of Patent: Dec. 14, 2010

(54) PRINTER DRIVER, APPARATUS, AND METHOD FOR CONVERTING CHARACTER FONTS WHEN PRINTING DATA TO A REDUCED NUMBER OF PAGES

(75) Inventors: Takashi Oda, Niigata (JP); Takashi Tomizuka, Niigata (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1106 days.

(21) Appl. No.: 11/518,286

(22) Filed: Sep. 11, 2006

(65) Prior Publication Data
US 2007/0201046 A1    Aug. 30, 2007

(30) Foreign Application Priority Data
Feb. 28, 2006    (JP)    ............... 2006-053151

(51) Int. Cl.
*G06K 15/02*    (2006.01)
*G09G 5/26*    (2006.01)
(52) U.S. Cl. ................. 358/1.11; 715/269; 715/271; 345/471; 345/472; 345/472.1; 345/472.2
(58) Field of Classification Search ........... 358/1.11; 715/269, 271; 345/471, 472, 472.1, 472.2
See application file for complete search history.

(56) References Cited

U.S. PATENT DOCUMENTS

| 2003/0174135 A1* | 9/2003 | Gyllenskog et al. ......... 345/471 |
| 2004/0191731 A1* | 9/2004 | Stork ........................ 434/180 |
| 2004/0205607 A1  | 10/2004 | Kim et al. |

FOREIGN PATENT DOCUMENTS

| JP | 11-115260 A    | 4/1999 |
| JP | 2003-134323 A  | 5/2003 |
| KR | 2005-0019661 A | 3/2005 |
| KR | 10-0509484 B1  | 8/2005 |

* cited by examiner

*Primary Examiner*—Twyler L Haskins
*Assistant Examiner*—Fred Guillermety
(74) *Attorney, Agent, or Firm*—Sughrue Mion, PLLC

(57) ABSTRACT

A computer readable recording medium storing a printer driver causing a computer to execute a process for generating, based on printing target data, printing data and sending to a printing device, the process which includes: selecting a character with a specific typeface from the printing target data; performing conversion of the selected character with the specific typeface into a character with other typeface; and generating the printing data based on the printing target data including the converted character.

3 Claims, 19 Drawing Sheets

CONVERT EMPHASIZED CHARACTERS WITH PRESCRIBED SIZE (4 POINT) OR SMALLER
INTO NORMAL CHARACTER → DOCUMENT BECOMES SHARPER AND BETTER APPEARANCE

● FILTER FUNCTION :
 OUTLINE OF PROCESS WHEN FUNCTION IS ENABLED (ON)
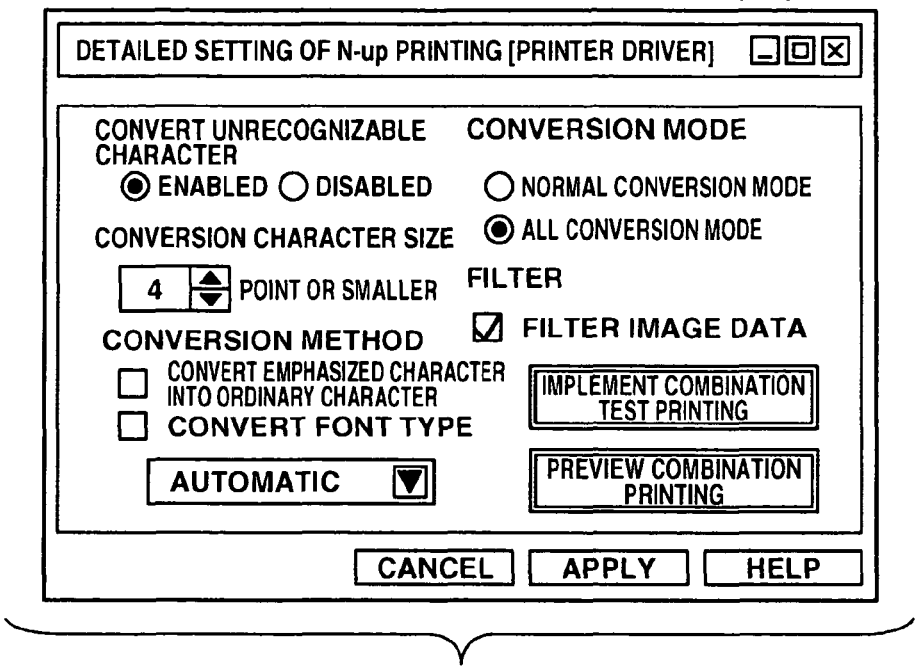
ORIGINAL DATA
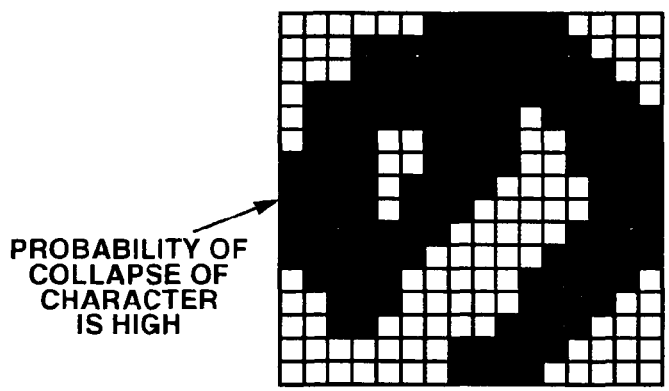
PROBABILITY OF COLLAPSE OF CHARACTER IS HIGH
FIG.15
DATA AFTER FILTERING
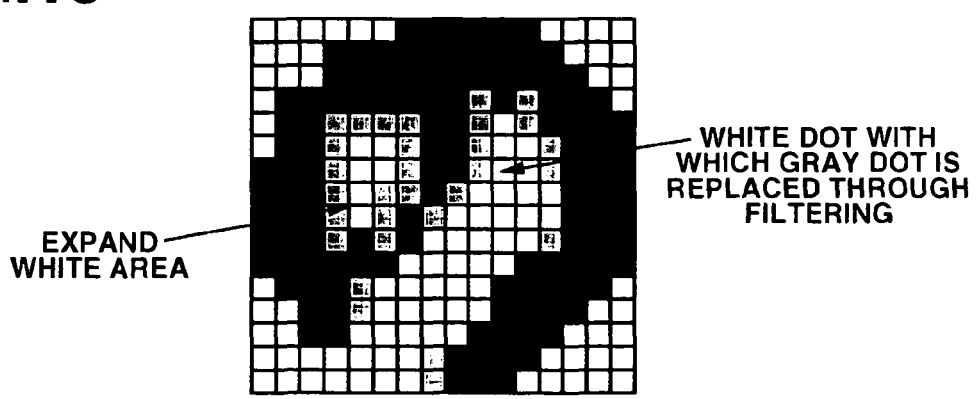
WHITE DOT WITH WHICH GRAY DOT IS REPLACED THROUGH FILTERING
EXPAND WHITE AREA ● DIAGRAM SHOWING ONE EXAMPLE OF FILTERING (EXPAND WHITE AREA HAVING TWO OR LESS DOTS INTO FOUR DOTS)

X IS TARGET DOT $\begin{cases} A1=\text{WHITE DOT, AND } B1=\text{BLACK DOT} \\ A2=\text{WHITE DOT, AND } B2=\text{BLACK DOT} \\ \quad\vdots \\ A8=\text{WHITE DOT, AND } B8=\text{BLACK DOT} \end{cases}$ IF ANY ONE OF THE ABOVE-MENTIONED EIGHT CONDITIONS HOLDS, AND X IS BLACK DOT, THE DOT IS TO BE REPLACED WITH WHITE DOT.

FIG.16

PRINTER DRIVER, APPARATUS, AND METHOD FOR CONVERTING CHARACTER FONTS WHEN PRINTING DATA TO A REDUCED NUMBER OF PAGES

BACKGROUND

1. Technical Field

The present invention relates to a recording medium storing a printer driver, a printing controlling method of the printer driver, a printing device, and a computer data signal embodied in a carrier wave, the printer driver being for generating, based on printing target data, printing data and sending to the printing device, more particularly relates to the recording medium storing the printer driver, the printing controlling method of the printer driver, the printing device, and the computer data signal embodied in the carrier wave, the printer driver being for generating printing data by converting a font type of a character or an emphasized character used in the printing target data.

2. Related Art

Conventionally, an N-up function (combination printing function) that collectively prints contents of N pages into one page has been known. Through this function, saving sheets of paper can be achieved. Additionally, recognizability of printed materials can be improved because of increase of volume of information per page.

Using this function, generally, it is possible to combine into 2 up to 16 up. However, when the N-up is performed at user's desirable reduction rate, there is a possibility that the character cannot be recognized since the size of the character in the printed material becomes too small. In this case, since reprinting is necessary, useless printed materials are increased rather than saving of printing sheets can be achieved.

SUMMARY

According to an aspect of the invention, there is provided a computer readable recording medium storing a printer driver causing a computer to execute a process for generating, based on printing target data, printing data and sending to a printing device, the process including: selecting a character with a specific typeface from the printing target data; performing conversion of the selected character with the specific typeface into a character with other typeface; and generating the printing data based on the printing target data including the converted character.

BRIEF DESCRIPTION OF THE DRAWINGS

An exemplary embodiment of the present invention will be described in detail based on the following figures, wherein:

FIG. 15 is a setting example of a printer driver display, and a diagram showing an output example corresponding to the setting example (filtering process);

FIG. 16 is an example of filtering;

DETAILED DESCRIPTION

Hereinbelow, an exemplary embodiment of a recording medium storing a printer driver, a printing controlling method of the printer driver, a printing device, and a computer data signal embodied in a carrier wave pertaining to the present invention will be described in detail with reference to the attached drawings. Furthermore, in this exemplary embodiment, a case where the present invention is applied to an N-up printing will be described.

Figure 1:
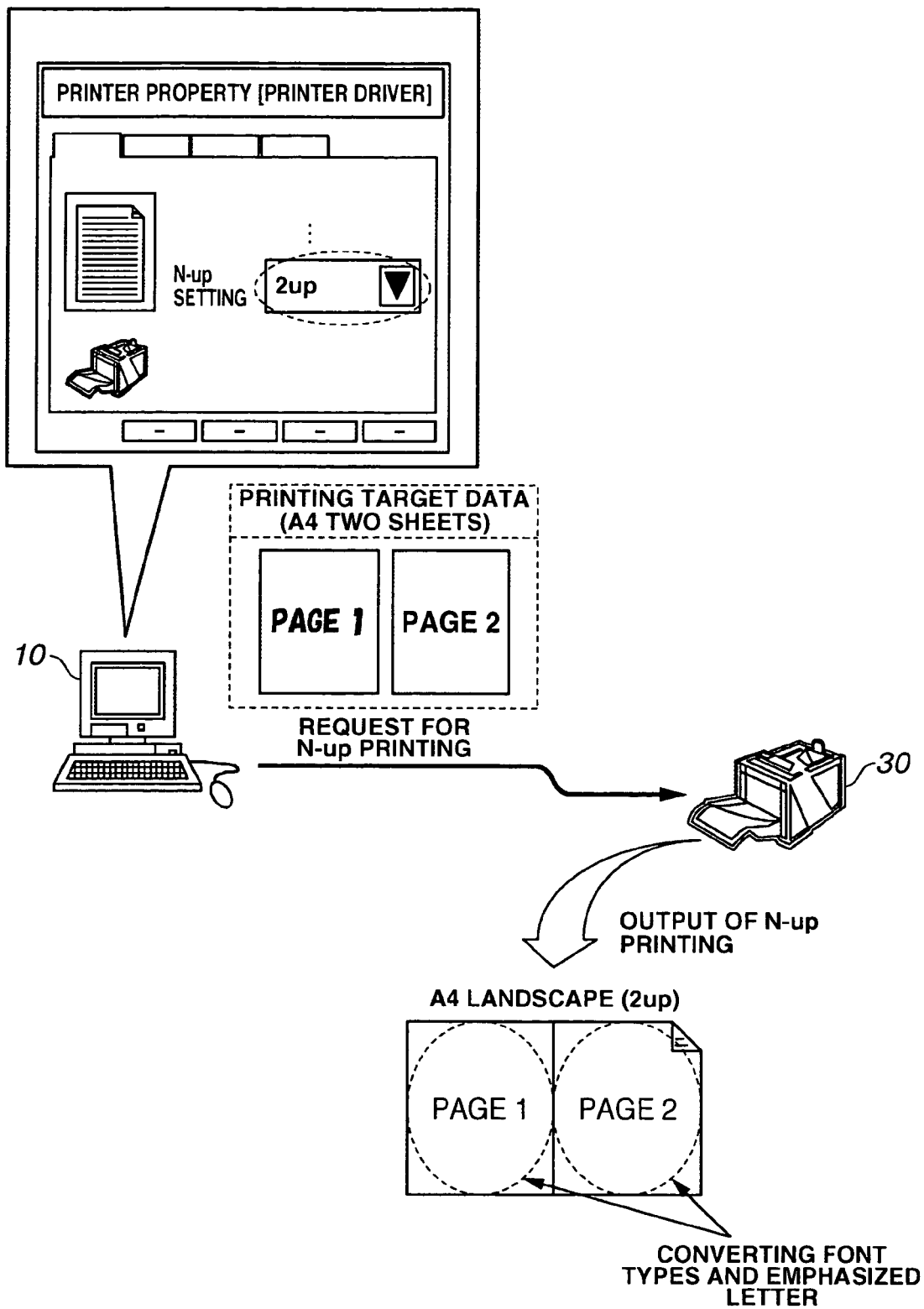
FIG. 1 is a diagram showing an example of an overall configuration of a printing system including a host terminal 10 to which a printer driver related to the present invention is applied.

FIG. 1 is a diagram showing an example of an overall configuration of a printing system including a host terminal 10 to which a printer driver related to the present invention is applied. Additionally, in this exemplary embodiment, only constituting units relating to the present invention will be described.

This printing system is configured to include the host terminal 10 that outputs printing data to a printer 30, and the printer 30 that forms, based on the printing data from the host terminal 10, an image to print out on a recording medium such as a sheet of paper.

Here, the printer driver is installed in the host terminal 10 in advance. This printer driver converts a printing target that is a document or the like into a page description language that the printer 30 can recognize, and outputs the printing data obtained through the conversion to the printer 30.

This printer driver is provided with an N-up function that collectively prints out contents of N pages into one page, allowing for saving of printing sheets or the like. As mentioned above, when this N-up function is applied, original data (hereinafter referred to as "printing target data") is scaled down, which may cause a problem in which a character cannot be recognized because of collapse of the character. This problem, especially, occurs when a boldface font or an emphasized character exists in the original data.

Therefore, in the present invention, when N-up printing is performed with the boldface type character or the emphasized character in the printing target data, character conversion (conversion of the font type or the emphasized character) is carried out by the printer driver, whereby the N-up printing can be achieved without having this type of problems.

Figure 2:
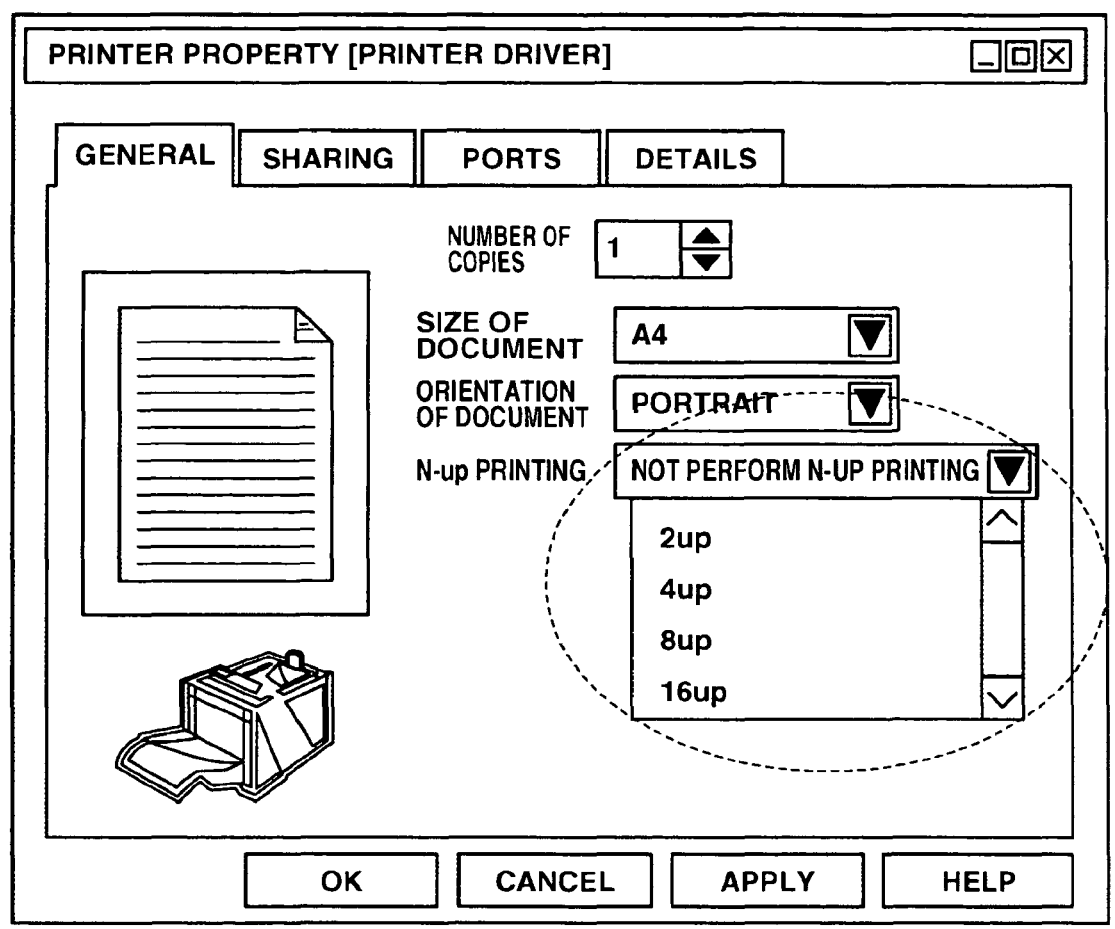
FIG. 2 is a diagram showing an example of a screen display of the printer driver (at the time when a list box is developed)

Here, when conducting the N-up printing, firstly, a user selects a desired N-up setting (2 up-16 up in this case) from a list box (bounded by a broken line in FIG. 2) that is provided for N-up setting item on the printer driver display shown in FIG. 2.

Figure 3:
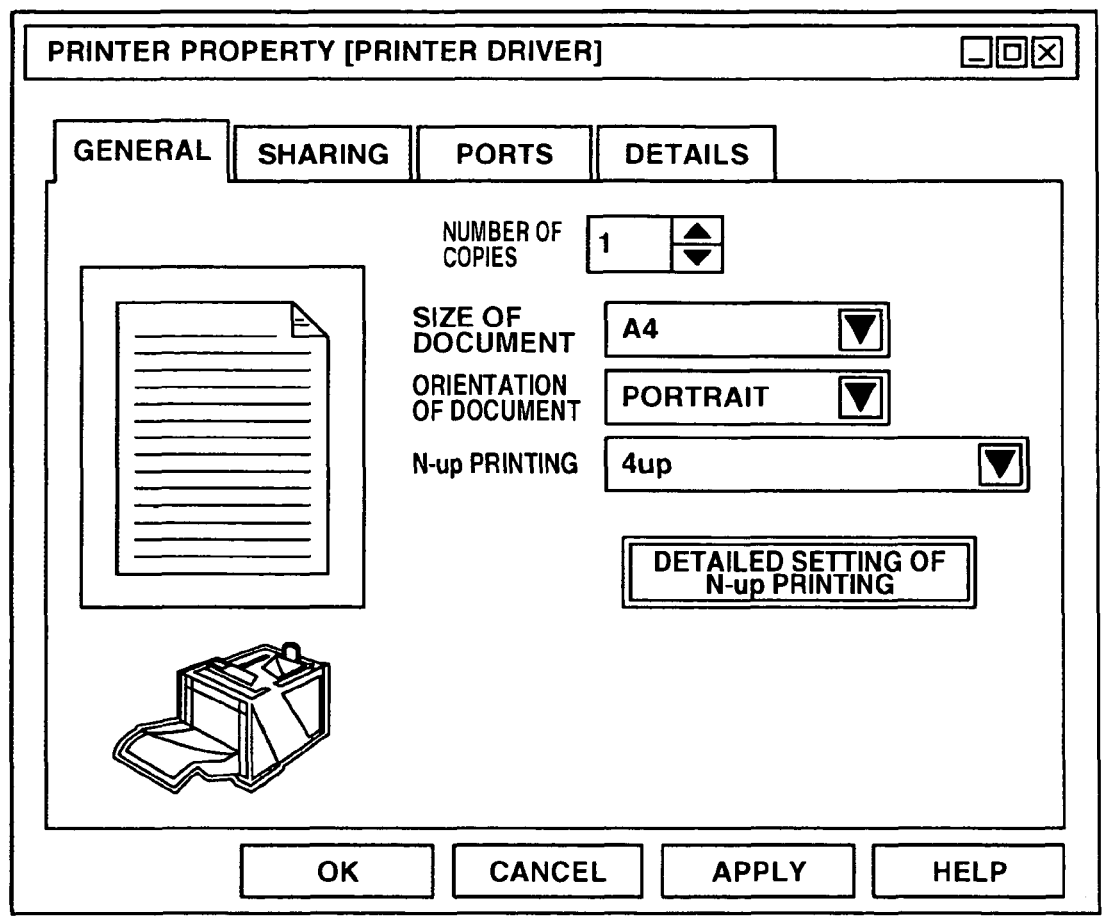
FIG. 3 is a diagram showing an example of a screen display of the printer driver.
Figure 4:
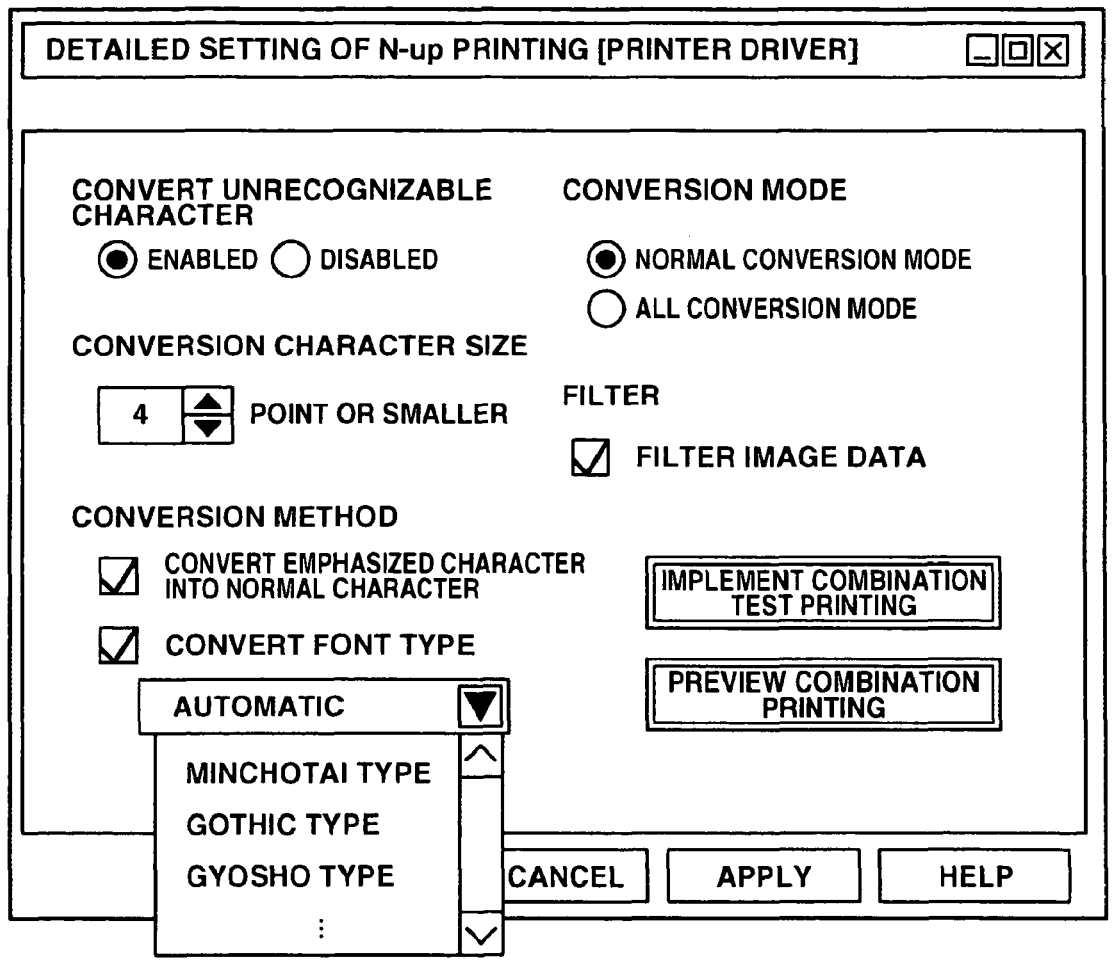
FIG. 4 is a diagram showing an example of a screen display of the printer driver (detailed setting of N-up printing)

And, as shown in FIG. 3, when the desired N-up setting is selected from the list box, and "detailed setting of N-up printing" button located just under the list box is depressed, a detailed display of the N-up setting as shown in FIG. 4 will be displayed.

On this display, detailed setting for the N-up printing can be set. Firstly, either item of radio boxes for "convert unrecognizable character" is selected to determine whether this function is enabled or disabled.

Here, if this function is enabled, the conversion method thereof is then selected by check boxes. In this case, "convert emphasized character into ordinary character" and "convert font type" are selected, which means that both of the functions are enabled. Additionally, if the "convert font type" is enabled, it is further necessary to select a font type after the conversion from a list box located just under the check boxes.

Additionally, in a "conversion mode" item in upper-right of the display, a "normal conversion mode" and an "all conversion mode" are provided, and either of the modes has to be exclusively selected by the radio box. If the "normal conversion mode" is selected, only a character with a character size designated in "conversion character size" or smaller is converted. However, if the "all conversion mode" is selected, all characters included in the printing target data are converted regardless of the size of the characters.

If a check box located just under a "filter" item is selected, a filter function can be enabled. In this filter function, collapse of character data can be reduced by filtering the character data in image data (for example, bit map data). In other words, in the above-mentioned character conversion (converting font type, and converting emphasized character), if data inputted from application to printer driver is text form data, the conversion can be realized without any problem. But if the data is image form data, this conversion cannot be applied. In this case, by using this filter function, the collapse of character or the like can be dealt with.

Additionally, in lower-right of the display, a "implement combination test printing" button and a "preview combination printing" button are provided. By depressing either one of these buttons, test printing or display of preview screen is performed, whereby a user can check the printing result reflecting each of the functions on the actually printed sheet or on the display.

Figure 5:
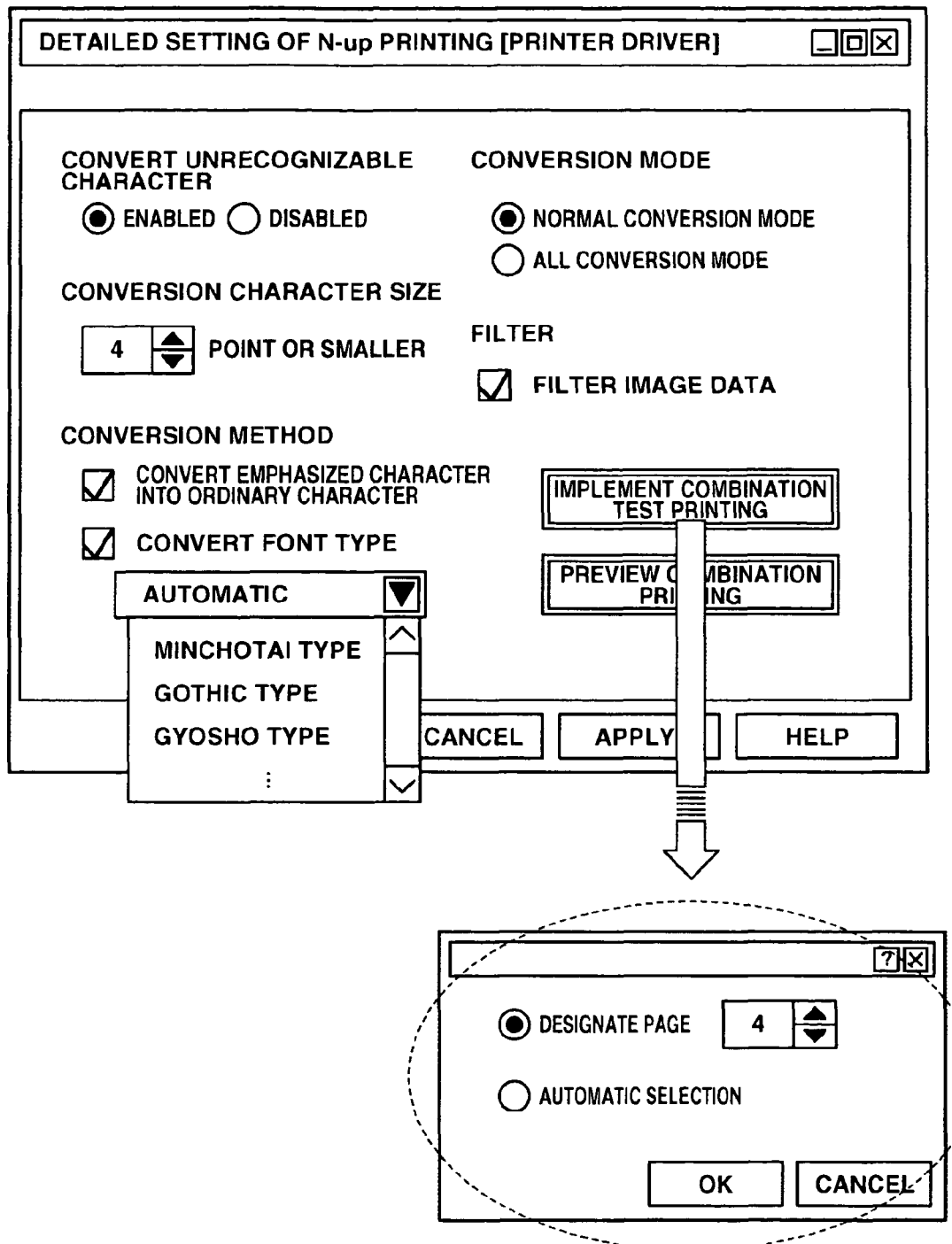
FIG. 5 is a diagram showing an example of a screen display of the printer driver (dialog box)

Here, if either the "implement combination test printing" button or the "combination printing preview" button is depressed, a dialog box (bounded by a broken line in FIG. 5) as shown in FIG. 5 is displayed. From this dialog box, a page to be tested or to be previewed can be designated. Additionally, if the page is not designated and an automatic selection is selected, a page in which a character conversion most frequently occurs is automatically selected.

Figure 6:
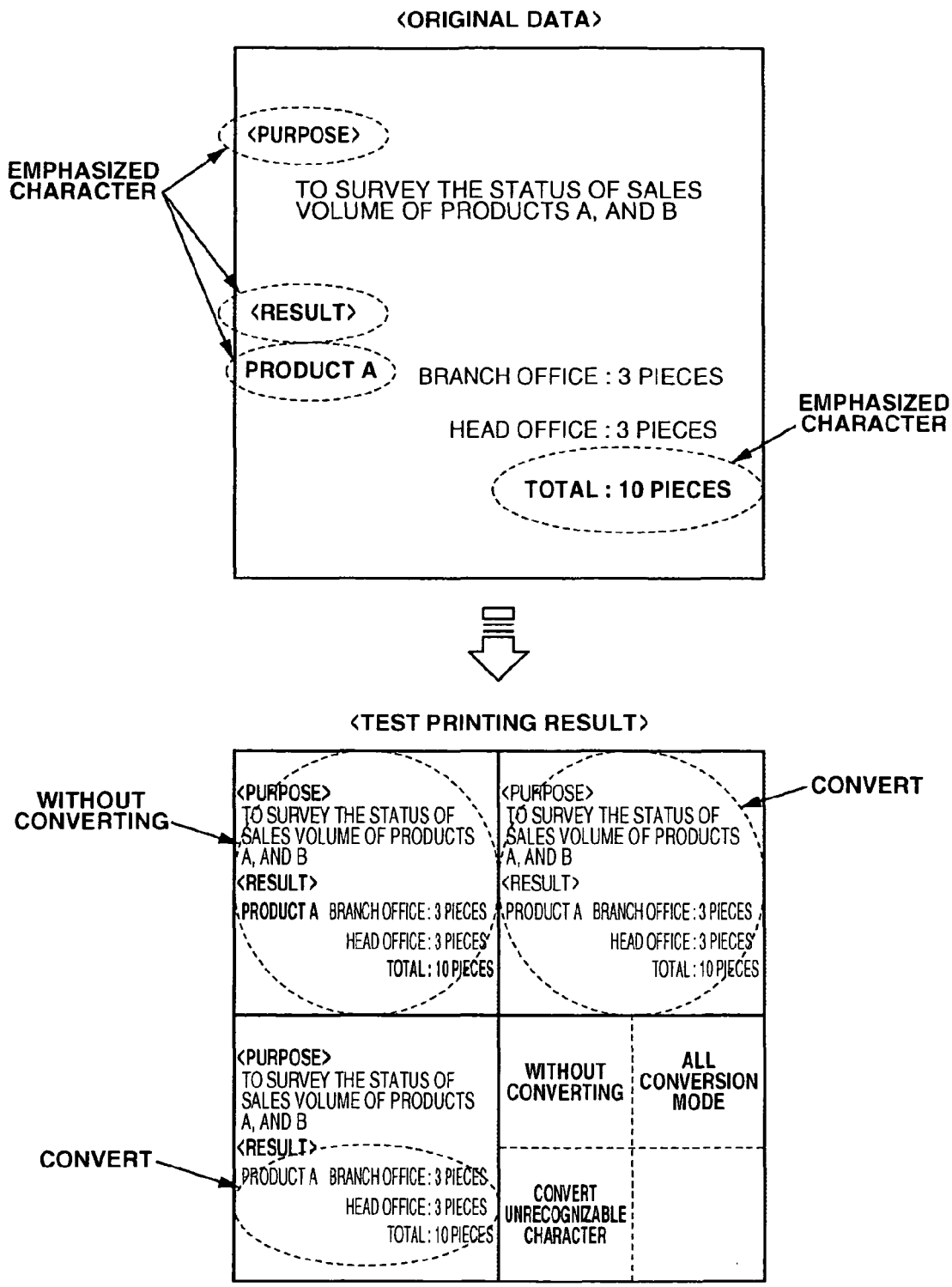
FIG. 6 is a diagram showing an outline of combination test printing.

For example, if a test printing is performed, a combination test printing shown in FIG. 6 is outputted. In this case, the test printing shown in the lower part of the FIG. 6 is performed based on the original data shown in the upper part of the FIG. 6, outputting a printing result in which printings corresponding to each of the modes are combined into one page.

A mode display column is provided in an empty space of lower right of this test printing. Referring to this display column, the user can easily grasp which area of printing corresponds to which mode. Additionally, if the preview is performed, the output similar to this test printing is shown on a screen such as a display (not shown in the figure) rather than on a sheet. Furthermore, although the printing results according to each of the modes for the same page are shown in the result of the combination test printing shown in FIG. 6, the output is not limited to this case, and the printing results according to each of the modes for plural pages may be outputted as the test printing.

Here, several setting examples of the printer driver display shown in FIG. 4 and output examples corresponding to the setting results will be given.

Figure 7:
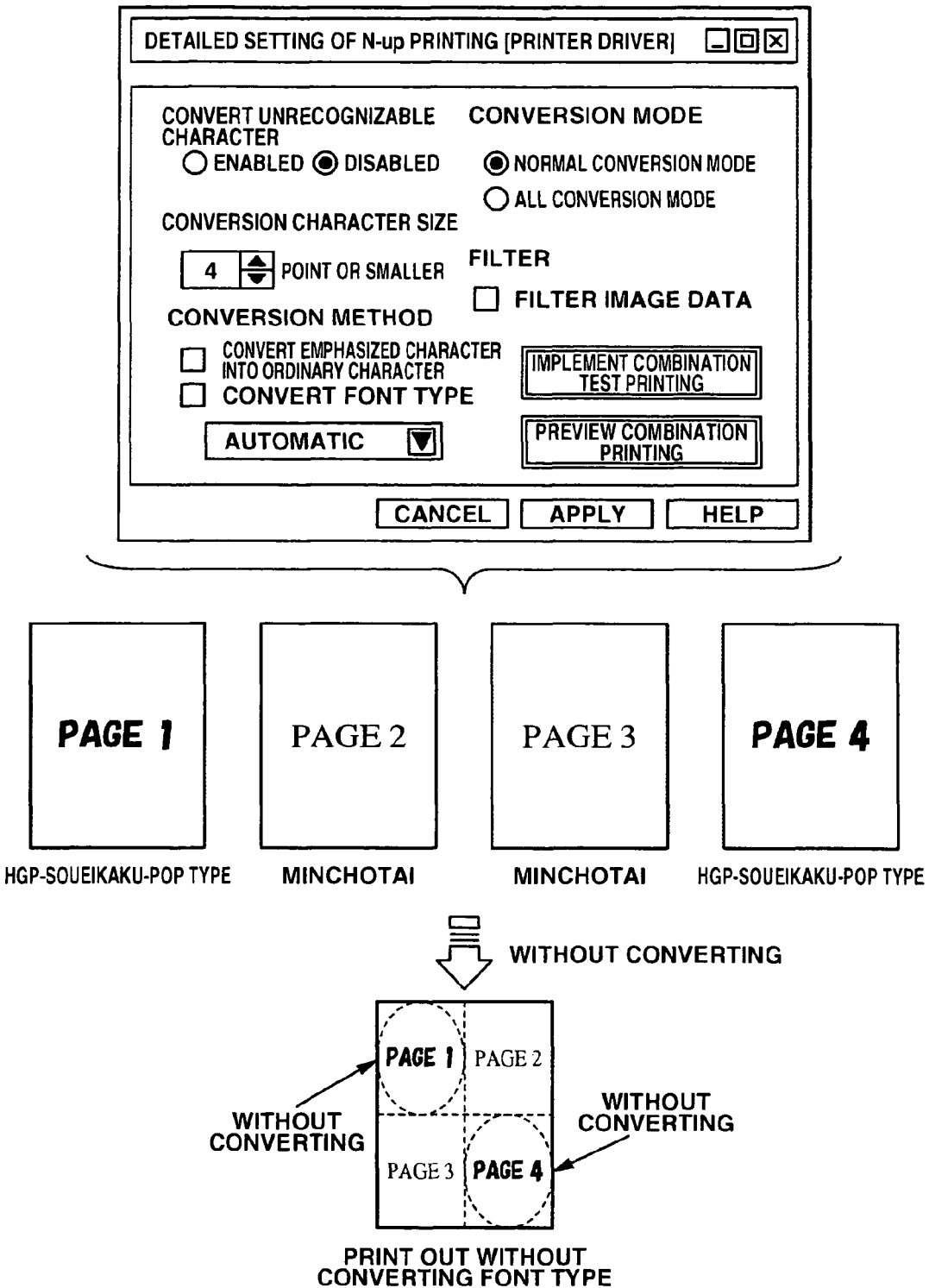
FIG. 7 is a setting example of a printer driver display, and a diagram showing an output example corresponding to the setting example (similar to conventional N-up printing)
Figure 8:
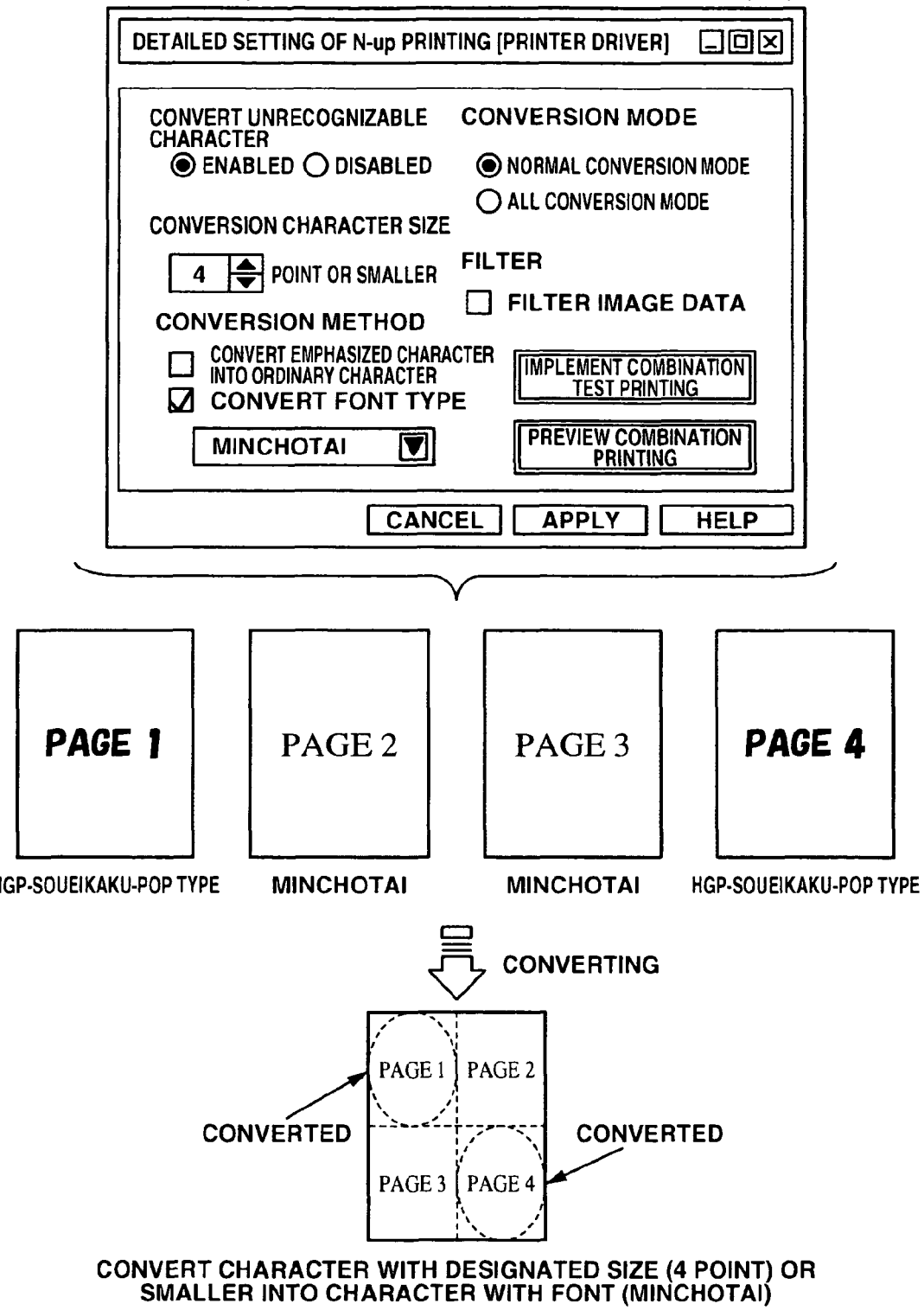
FIG. 8 is a setting example of a printer driver display, and a diagram showing an output example corresponding to the setting example (converting font type)

Firstly, FIGS. 7 and 8 are diagrams showing the outline of the case where the N-up printing is performed for the printing target data in which font types are set to an HGP-Soueikaku-POP type for the first and the fourth pages, and to a Minchotai type for the second and the third pages.

In this case, in the setting example shown in FIG. 7, since the N-up printing is performed with the function of the present invention being disabled, the printing result is similar to that of the conventional N-up printing. This setting example shows that recognizability of the first and the fourth pages having relatively bolder face font is slightly deteriorated. On the other hand, in the setting example shown in FIG. 8, the N-up printing is performed with the conversion of a character having a designated size (4 point) or smaller into a thinner font (Minchotai type). Thus, the font type of the first and the fourth pages is converted into the Minchotai type. As a result, through this conversion into the Minchotai type, the character on the first and the fourth pages do not collapse, and recognizability is maintained.

Figure 9:
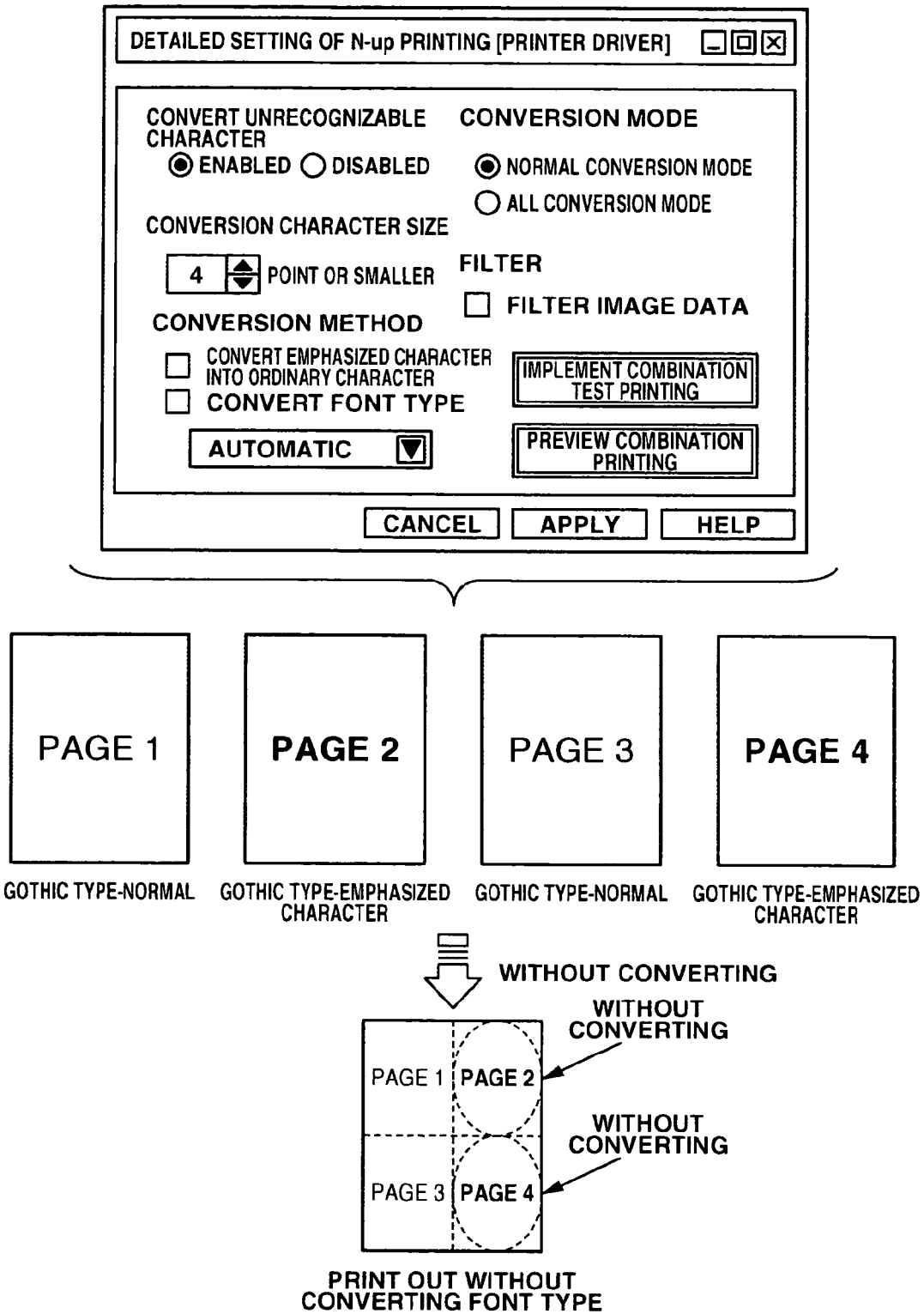
FIG. 9 is a setting example of a printer driver display, and a diagram showing an output example corresponding to the setting example (similar to the conventional N-up printing)
Figure 10:
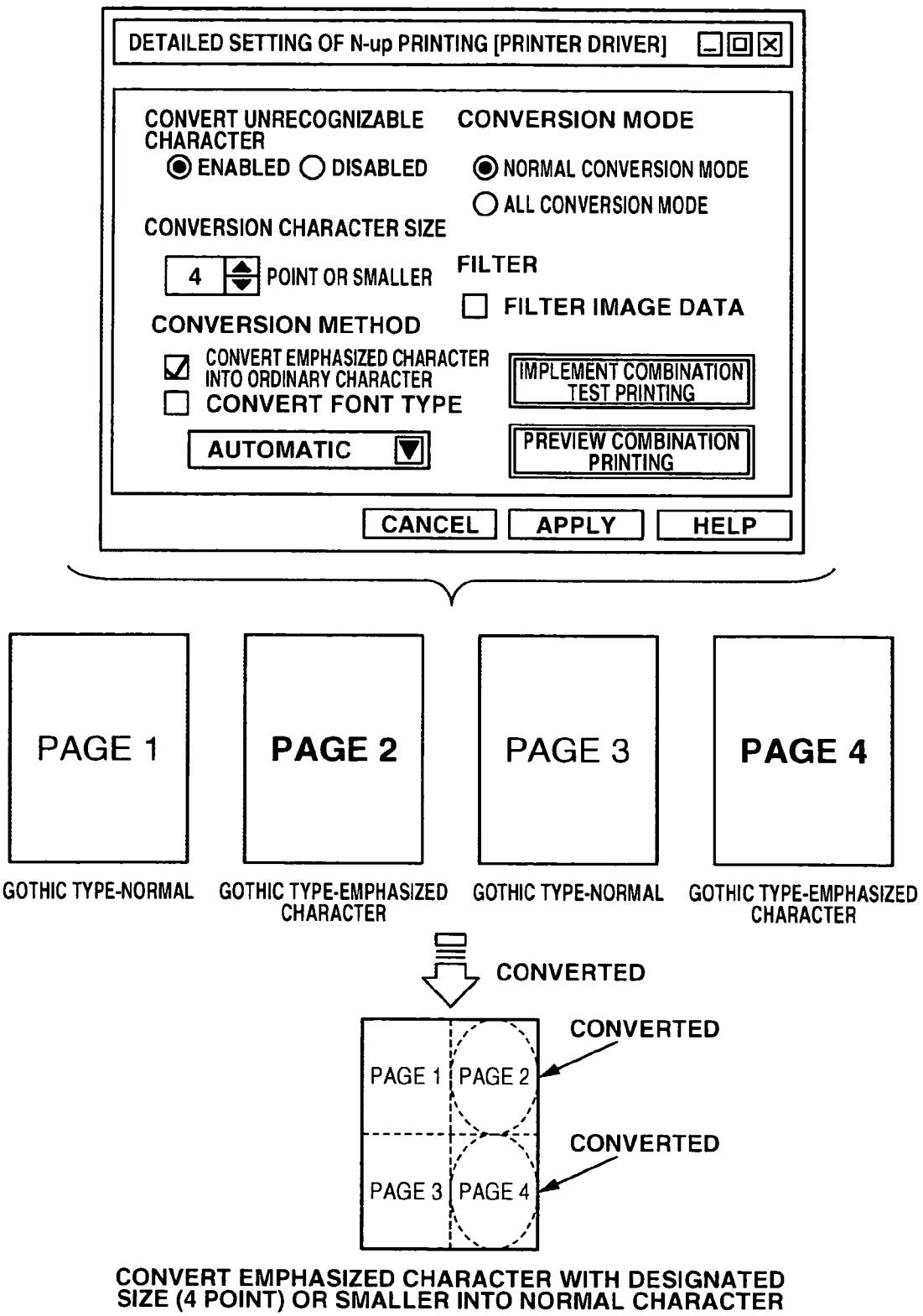
FIG. 10 is a setting example of a printer driver display, and a diagram showing an output example corresponding to the setting example (converting an emphasized character)

Additionally, FIGS. 9 and 10 show the outline of performing the N-up printing for printing target data having a normal character in the first and the third pages, and an emphasized character in the second and the fourth pages.

In this case, in a setting example shown in FIG. 9, since the N-up printing is performed without the function of the present invention, the similar printing result to the conventional N-up printing can be obtained. This result shows that the recognizability of the second and the fourth pages that have emphasized characters is slightly deteriorated. In a setting example shown in FIG. 10, on the other hand, since the N-up printing is performed with the replacement of emphasized characters having a designated size (4 point) or smaller with normal characters, the emphasized characters used in the second and the fourth pages are replaced with the normal characters. This result shows that the characters do not collapse due to the replacement with the normal character, and recognizability is maintained.

Figure 11:
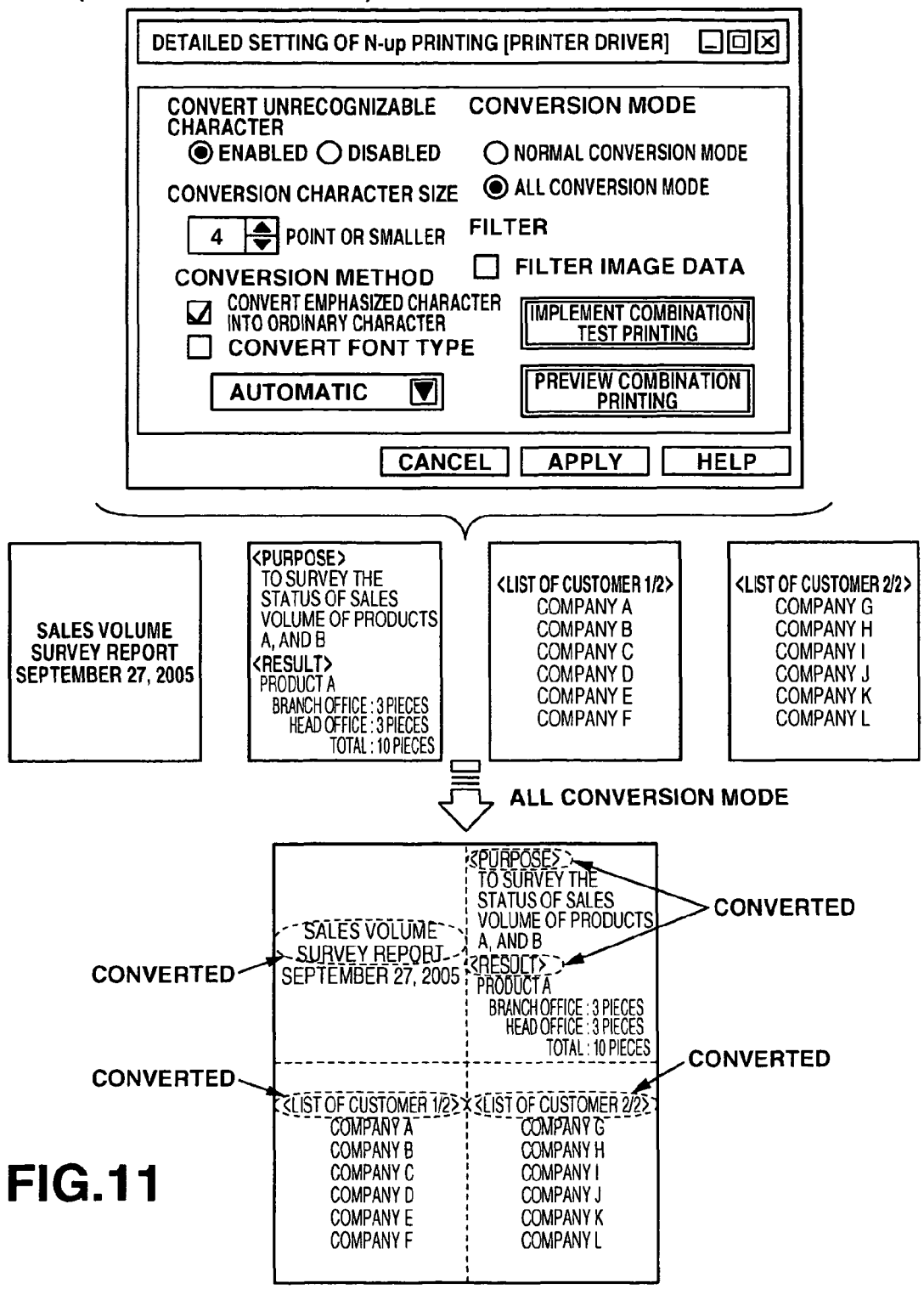
FIG. 11 is a setting example of a printer driver display, and a diagram showing an output example corresponding to the setting example (converting an emphasized character: all conversion mode)
Figure 12:
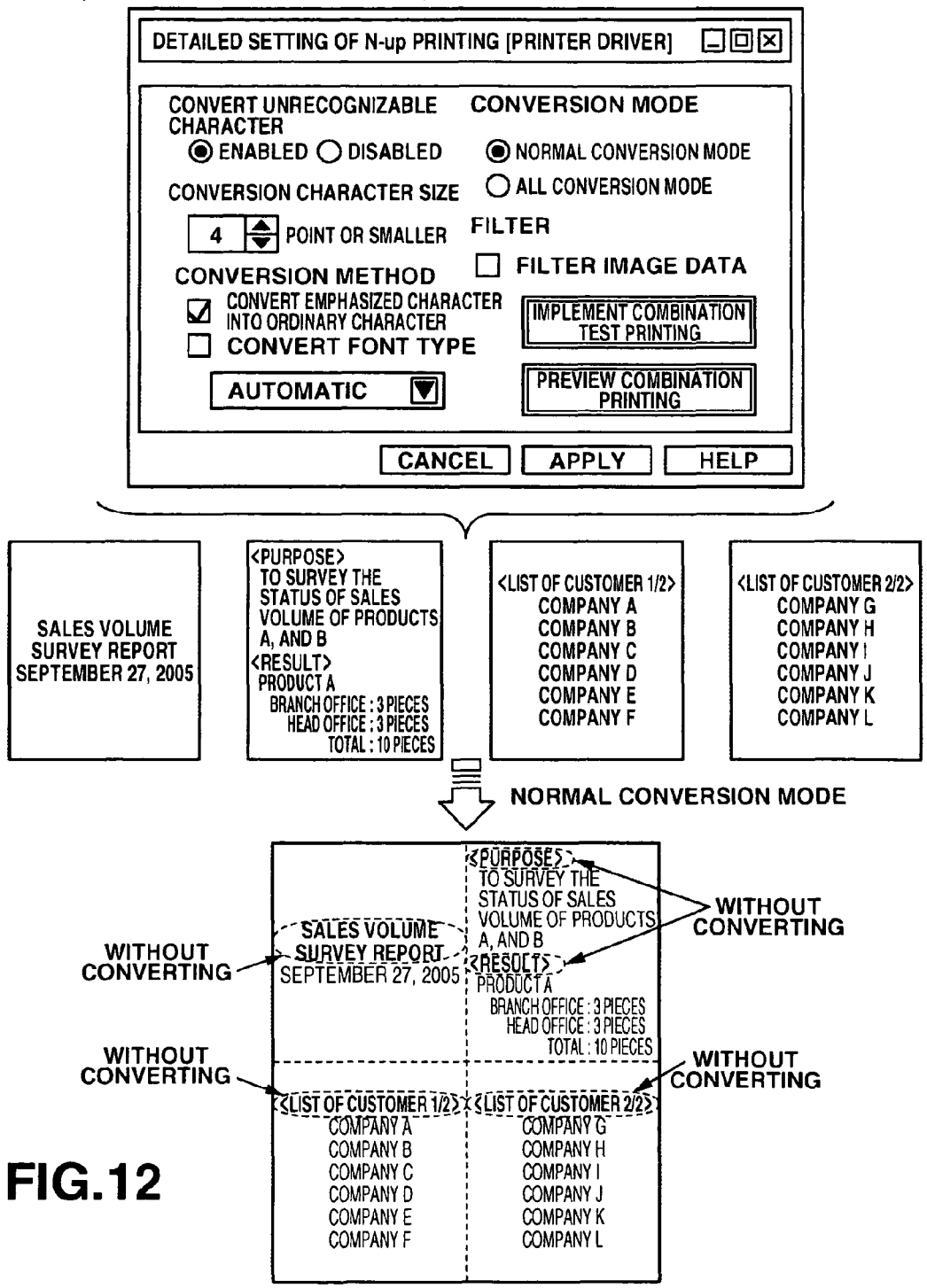
FIG. 12 is a setting example of a printer driver display, and a diagram showing an output example corresponding to the setting example (converting an emphasized character: normal conversion mode)

Next, FIGS. 11 and 12 show the outline of performing the N-up printing for the same printing target data in the all conversion mode and in the normal conversion mode, in which the emphasized characters are converted into the normal characters.

Here, in a setting example shown in FIG. 11, since the all conversion mode is selected, all the emphasized characters in the printing target data are replaced with the normal characters. The result shows that the entire document becomes flat. In a setting example shown in FIG. 12, on the other hand, since the normal conversion mode is selected, only the emphasized characters with the designated size (4 point) or smaller are replaced, and the titles are emphasized. Thus, the document becomes shaper and better appearance.

Figure 13:
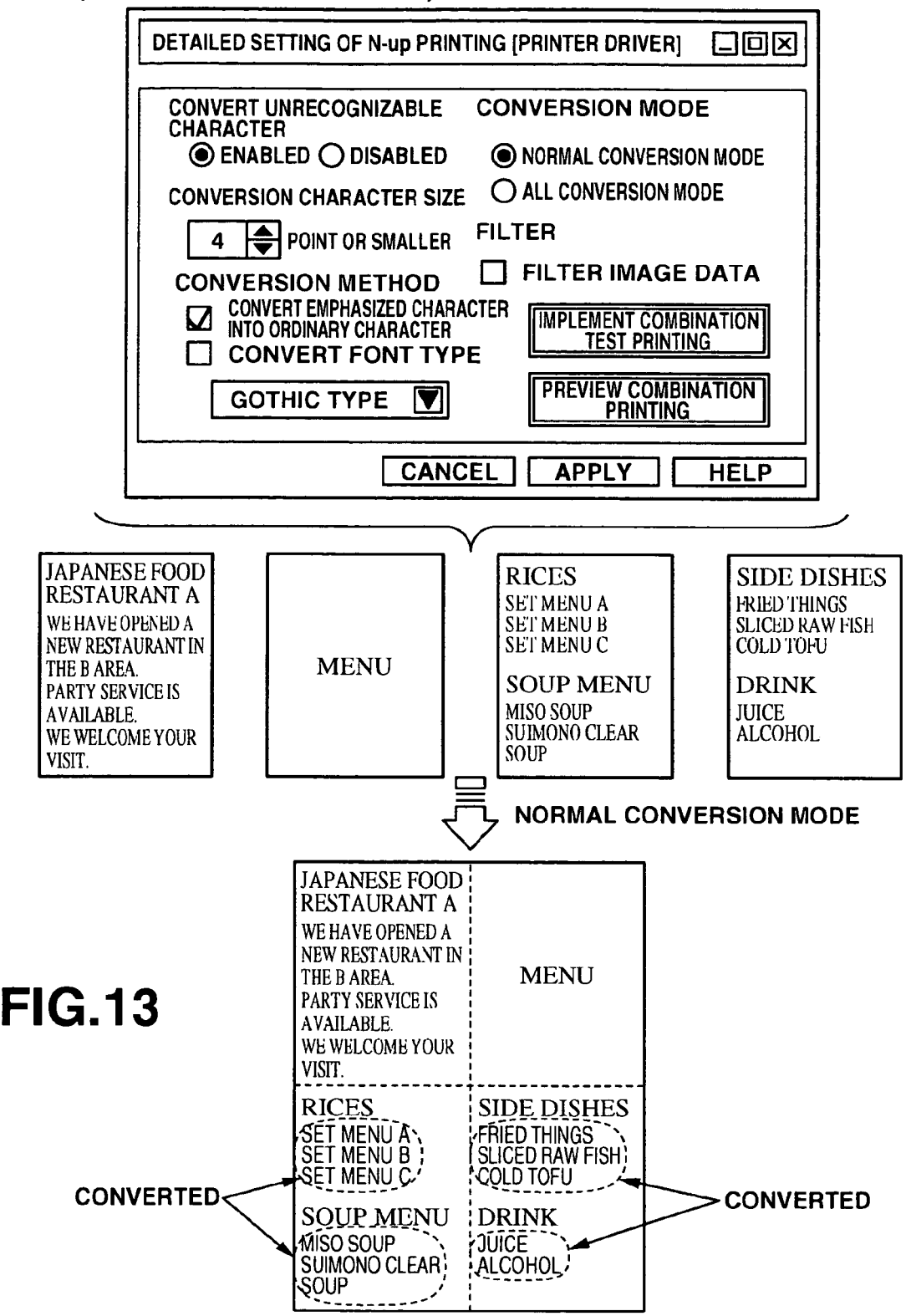
FIG. 13 is a setting example of a printer driver display, and a diagram showing an output example corresponding to the setting example (converting font type: normal conversion mode)
Figure 14:
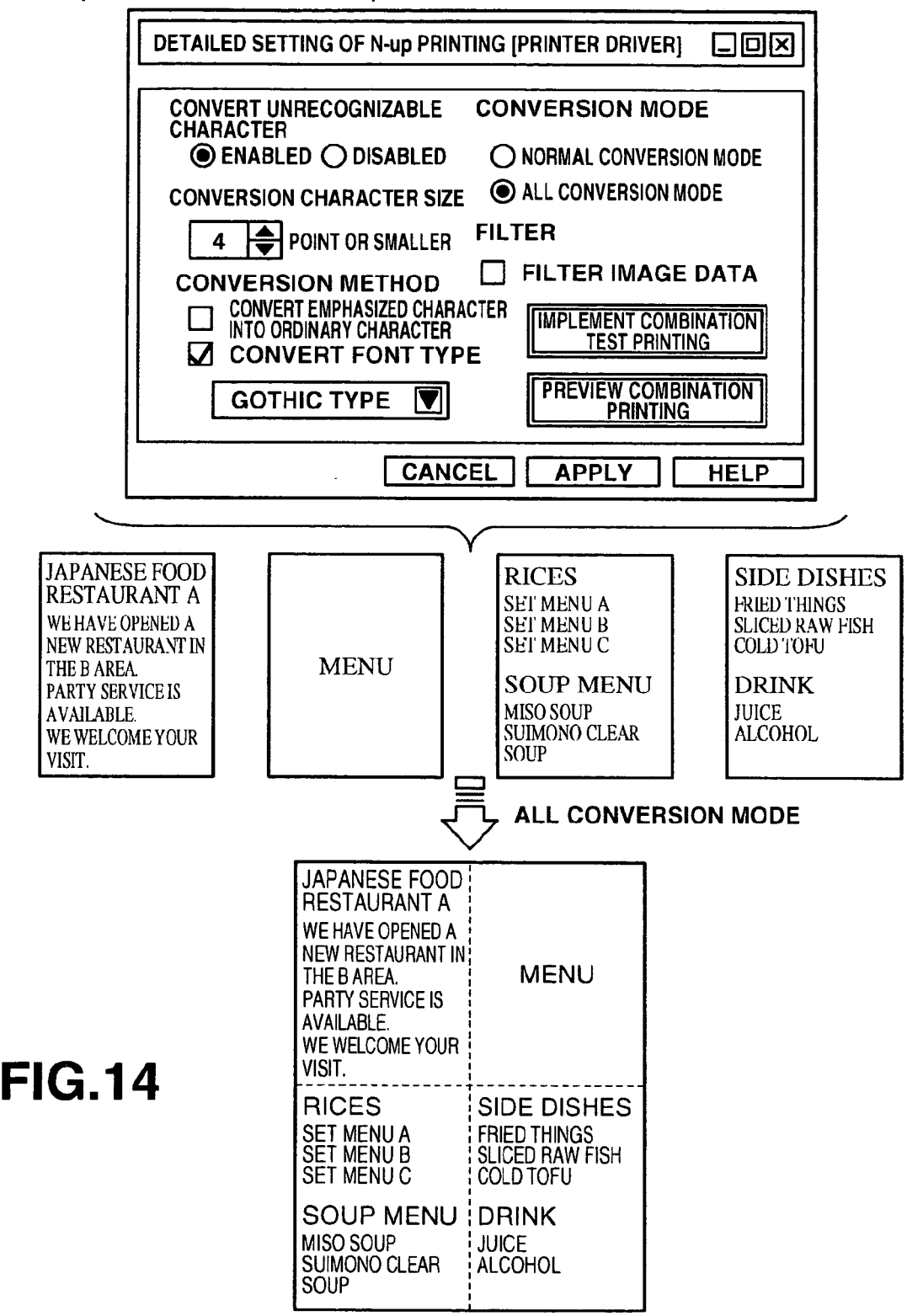
FIG. 14 is a setting example of a printer driver display, and a diagram showing an output example corresponding to the setting example (converting font type: all conversion mode)

Lastly, FIGS. 13 and 14 show the outline of performing the N-up printing in the normal conversion mode and in the all conversion mode by converting a font for the same printing target data.

Here, in a setting example shown in FIG. 13, since the normal conversion mode is selected, only the characters with a designated size (point 4) or smaller in the printing target data are replace with the Gothic type. As a result, both kaisho type and the Gothic type characters are mixed in the result, which gives the feeling of strangeness. In a setting example shown in FIG. 14, on the other hand, since the all conversion mode is selected, all the characters in the printing target data are replaced with the Gothic type characters. Accordingly, the entire document becomes well-organized and better appearance.

As mentioned above, by setting various setting items regarding N-up printing, and making the functions enabled/disabled according to the printing target data, the collapse of characters due to the scale down by N-up printing can be reduced. Additionally, in a case when font types are conformed, advantageous effects where the entire document becomes well organized or the like can be realized.

By the way, in the explanation mentioned above, since the conversion is made for characters (converting font types, and converting the emphasized characters), text type data has to be inputted into the printer driver. However, in certain applications, image type data may be inputted into the printer driver.

This case, as mentioned earlier, can be dealt with by enabling the filter function. To enable the filter function, as shown in FIG. 15, a check box provided for the filter function item is checked.

Through this function, as shown in FIG. 15, formation of dots adjacent to dots (dots shown in gray) located in areas having a probability of collapse is controlled. This control can be achieved, for example, using a filter shown in FIG. 16. In a filtering example shown in FIG. 16, white areas with two dots or less (area where no dot is formed) are expanded to four dots.

Figure 17:
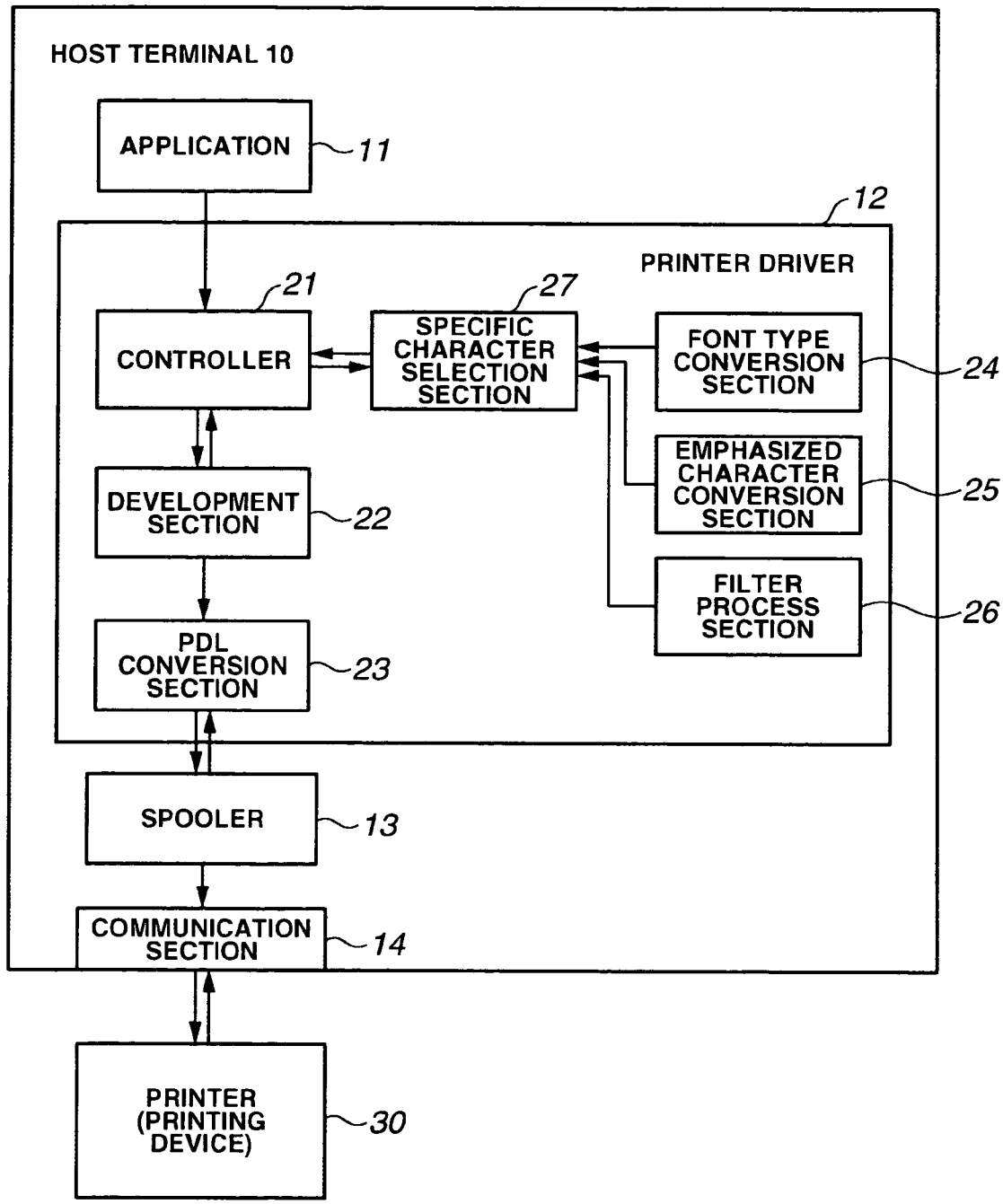
FIG. 17 is a diagram explaining a part of a functional configuration of the host terminal 10 shown in FIG. 1.

Here, using FIG. 17, a part of a functional configuration of the host terminal 10 shown in FIG. 1 will be described.

The host terminal 10 is, as its functional configuration, configured to include an application 11 that generates and performs compilation or the like of printing target data, a printer driver 12 that converts the printing target data into data with a format that a printer 30 can interpret and generates printing data, a spooler 13 that performs transmitting control of the generated printing data, and a transmission section 14 that includes a communication interface connecting the host terminal 10 and the printer 30.

When conducting printing, the application 11 sends the printing target data such as a document to the printer driver 12. The printer driver 12 converts the printing target data received from the application 11 into a page description language that the printer 30 can interpret, generates the printing data, and sends the data to the spooler 13. Then, the spooler 13 transmits the printing data received from the printer driver 12 through the communication section 14 to the printer 30.

Here, the printer driver 12 is, as its functional configuration, configured to include a controller 21, a development section 22, a PDL (Page Description Language) conversion section 23, a font type conversion section 24, an emphasized character conversion section 25, a filter process section 26, and a specific character selection section 27.

The controller 21 plays an overall control function according to the present invention. Additionally, the development section 22 performs a function of developing the printing target data into image data, and the PDL conversion section 23 converts the image data into printing data with a page description language format that the printer 30 can interpret, and also performs a function of a transmitting control of the converted data.

The font type conversion section 24 plays a function of converting a font type of a character in the printing target data, and the emphasized character conversion section 25 performs a function of converting the emphasized character in the printing target data into an ordinary character. Additionally, the specific character selection section 27 selects, according to the above-mentioned each of the modes or the like, a specific character to be converted from the printing target data. In other words, in the font type conversion section 24 and the emphasized character conversion section 25, the specific characters selected by the specific character selection section 27 are the conversion targets.

The filter process section 26 plays a function of performing filter process, using a prescribed filter (see FIG. 16), for the character data in the image data generated by the development section 22. In other words, as described with reference to FIG. 15, the formation of the dots adjacent to the dots (dots shown in gray) located in the area having the probability of collapse is controlled.

Here, in the exemplary embodiment, a case where printing data that is converted into the page description language is transmitted from the host terminal 10 to the printer 30 has been described. However, this printing data is not necessarily the page description language type, and is applicable if the printer 30 can perform printing based on the transmitted printing data. Thus, for certain printers, the system may be configured such that image data is transmitted without converting.

Figure 18:
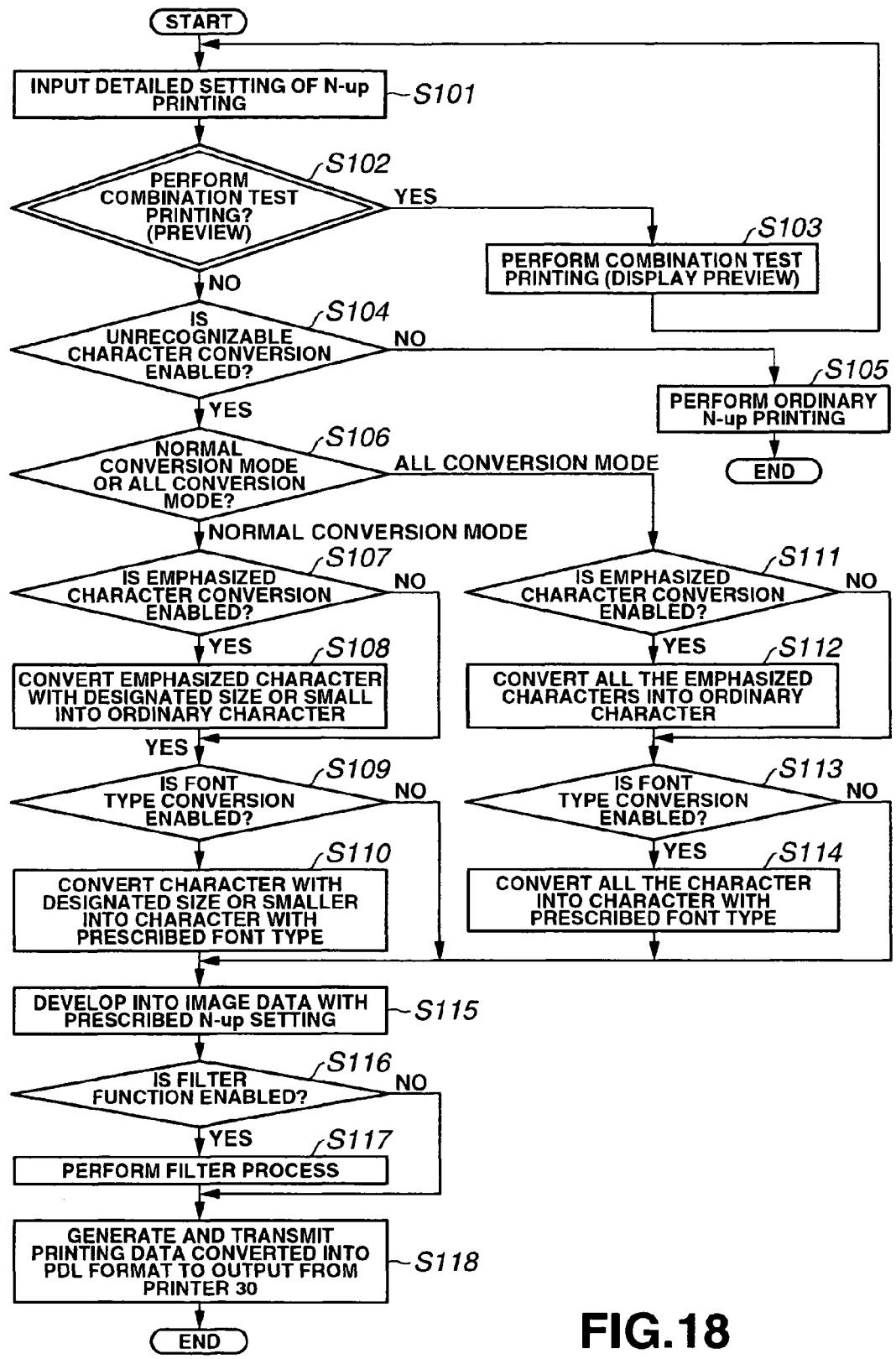
FIG. 18 is a flow chart showing an operation of an N-up printing process in the printing system shown in FIG. 1.

Next, using FIG. 18, an operation of an N-up printing process of the printing system shown in FIG. 1 will be described. In this description, a process after the printer driver is started will be described.

When the printer driver is started, a user performs an input operation for detailed settings of N-up printing using the display (Step S101). In other words, the user sets enabled (on)/disabled (off) or the like for each of the modes from the detailed settings display of N-up printing shown in FIG. 4.

When, after completing this input operation, the user depresses an "implement combination test printing" button (YES in step S102), the combination test printing shown in FIG. 6 is outputted (step S103). This combination test printing is performed by generating the image data for the test printing through the coordination among the font type conversion section 24, the emphasized character conversion section 25, and the development section 22 in accordance with the controller 21. Additionally, when the user depresses a "preview combination printing" button, the same output as this combination test printing is displayed on the screen by the controller 21.

Next, after the user refers to the printing result of this combination test printing, and completes each of the settings concerning the N-up printing, the controller 21 in the printer driver determines whether each of the modes is enabled or disabled. In this determination process, firstly, it is determined whether an unrecognizable character conversion function is enabled (on) or disabled (off) (step S104). In other words, it is determined whether the function of the present invention is enabled or disabled.

Here, when the unrecognizable character conversion function is disabled (off) (NO in step S104), the printing is performed with ordinary N-up printing (step S105), and then the process is end. However, when the unrecognizable character conversion function is enabled (on), it is then determined which mode of the normal conversion mode or the all conversion mode is enabled (on) (step S106).

After this determination is completed, subsequently, it is determined whether an emphasized character conversion mode is enabled (on) or disabled (off) (step S107 or step S111). Here, when the emphasized character conversion function is disabled (off) (NO in step S107, or NO in step S111), then the process moves on to determine whether a font conversion function is enabled (on) or disabled (off). When the emphasized character conversion function is enabled (on) (YES in step S107, or YES in step S111), an emphasized character in the printing data is converted into an ordinary character by the emphasized character conversion section 25 (step S108, or step S112). Additionally, in this case, the conversion targets are the characters selected by the specific character selection section 27, and more specifically, are the characters with a designated size or smaller in the normal conversion mode, and are all characters in the printing target data in the all conversion mode.

After this emphasized character conversion is completed, it is then determined whether the font conversion function is enabled (on) or disabled (off). Here, when the font conversion function is disabled (off) (NO in step S109, or NO in step S113), the process proceeds to the development process of the image data. When the emphasized character conversion function is enabled (on) (YES in step S109, or YES in step S113), the font type of the character in the printing target data is converted by font type conversion section 24 (step S110 or step S114). Additionally, in this case, the conversion targets are characters designated by the specific character selection section 27, more specifically, are the characters with a designated size or smaller in the normal conversion mode, and are all characters in the printing target data in the all conversion mode.

After the emphasized characters or the font types are converted as stated above, this converted data is developed into image data with a prescribed N-up setting by the development section 23 (step S115).

After this development of the image data is completed, it is then determined by the controller 21 whether the filter function is enabled (on) or disabled (off). Here, when the filter function is disabled (off) (NO in step S116), the process proceeds to the transmission process of the printing data. When the filter function is enabled (on) (YES in step S116), the filter function is performed for the character data in the developed image data by the filter process section 26.

Furthermore, after having been converted into the page description language by the PDL conversion section 23, this image data is transmitted from the spooler 13 through the transmission section 14 to the printer 30, and is outputted from the printer 30 with the desired N-up setting (step S1118).

As described above, in the N-up printing, the system of the present invention is configured to convert the characters in the printing target data into thinner face characters, generate the image data based on the printing target data including these converted characters, and transmit the generated image data to the printer 30, whereby the probability of collapse of the characters caused by scaling down the boldface characters, which is occurred in the conventional N-up printing, can be eliminated.

This system makes it possible to eliminate misprints with N-up printing, and to reduce the waste of sheets of paper.

Additionally, in the above-mentioned exemplary embodiment, the case where the present invention is applied to perform the N-up printing has been described as one example. However, the present invention is applicable not only to the scaling down printing with the N-up setting, but also to just the scale down printing. In this case, the same effect as the above-mentioned exemplary embodiment can be achieved.

Additionally, the present invention is applicable not just to the N-up printing or the scale down printing, but also to the ordinary printing other than the N-up printing or the scale down printing. In the case of the ordinary printing, because the font type or the like is easily organized, it is possible to enhance the convenience.

Figure 19:
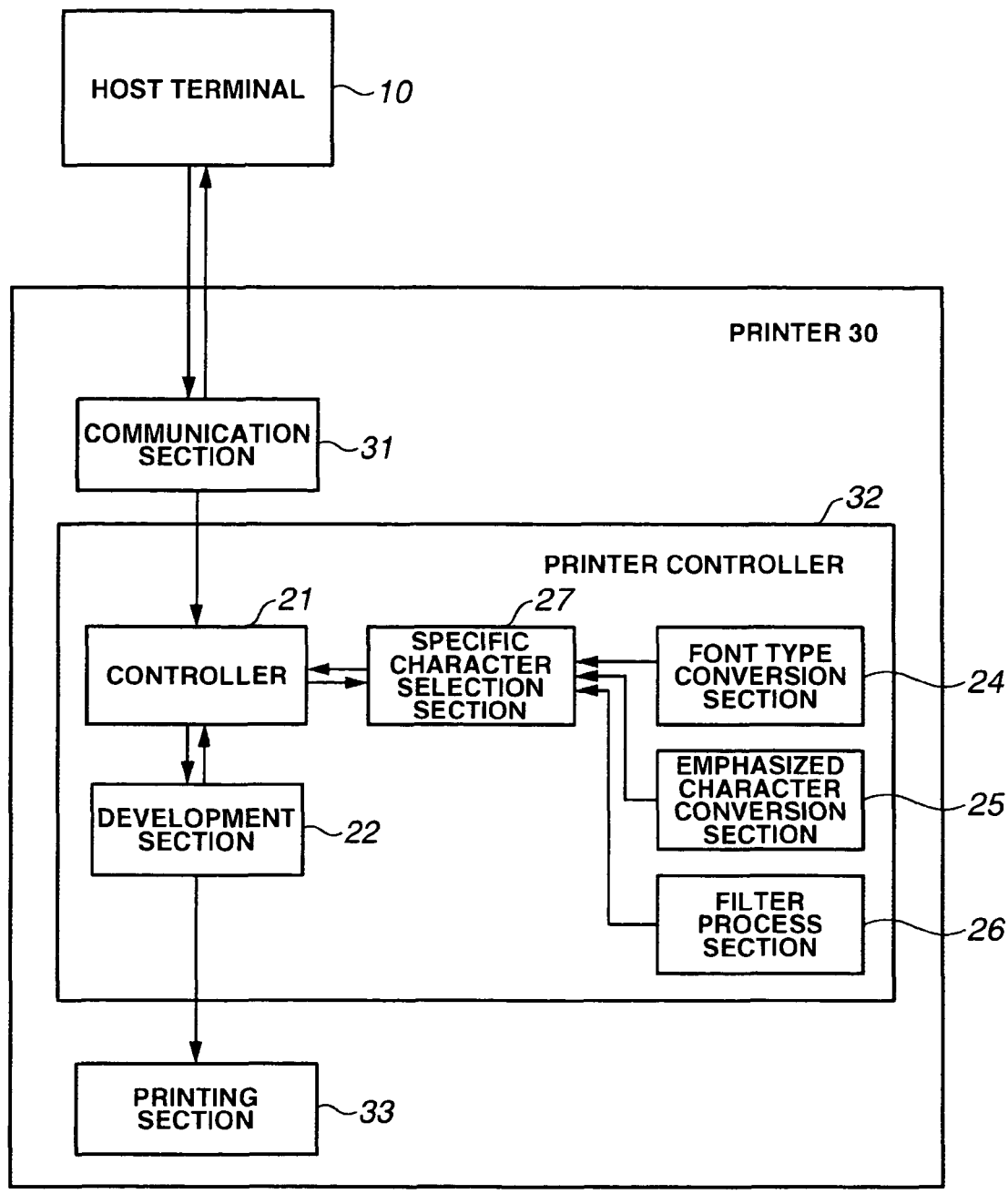
FIG. 19 is a diagram showing an outline of a modification pertaining to the present invention (printer).

Additionally, in the above-mentioned exemplary embodiment, the case where the present invention is applied to the host terminal 10 has been described. However, the present invention may be applied to the printer 30. This case, as shown in FIG. 19, can be achieved by installing to the printer 30 each of the processing function sections configuring the above-mentioned printer driver 12.

Besides to these, the present invention may be embodied with any alteration being given within the scope of the gist thereof, being not limited to the embodiment as described above with reference to the attached drawings.

The recording medium storing the printer driver, the printing control method of the printer driver, the printer device, and the computer data signal embodied in the carrier wave of the present invention are applicable to any printer driver that generates the printing data based on the printing target data to transmit to the printing device. If, for example, the present invention is applied in the combination (N-up) printing, misprints with the N-up printing can be eliminated and waste of sheets of paper can be reduced.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A computer readable recording medium storing a printer driver causing a computer to execute a process for generating, based on printing target data, printing data, and sending to a printing device, the process comprising:
   selecting a boldface character with a smaller size than a prescribed size from the printing target data;
   performing conversion of the selected boldface character with the smaller than the prescribed size into a normal character; and
   generating the printing data based on the printing target data including the converted character,
   wherein a boldface character with a larger size than the prescribed size in the printing target data is not converted into the normal character, and wherein the generating process comprises generating the printing data by combining a plurality of printing target data including the converted character for a plurality of pages into one page.

2. The computer readable recording medium storing the printer driver according to claim 1, wherein the process comprises:

displaying the printing target data including the converted character on a display as a preview display.

3. A printing device for printing based on printing data, a comprising:

a selection section that selects a boldface character with a smaller size than a prescribed size from the printing data;

a conversion section that performs conversion of the boldface character with the smaller size than the prescribed size selected by the selection section into a normal character;

a printing section that prints based on the printing data including the character converted by the conversion section, wherein a boldface character with a larger size than the prescribed size in the printing data is not converted into the normal character; and wherein the printing data is printing data in which a plurality of printing data for a plurality of pages are combined into one page.

* * * * *